United States Patent [19]

Betzler

[11] Patent Number: 5,012,840
[45] Date of Patent: May 7, 1991

[54] FLUID FLOW INDICATOR SYSTEM

[75] Inventor: Mark H. Betzler, McDaniel, Md.

[73] Assignee: Dresser Industries, Inc., Dallas, Tex.

[21] Appl. No.: 521,058

[22] Filed: May 2, 1990

[51] Int. Cl.⁵ ............................................. F16K 37/00
[52] U.S. Cl. .................................... 137/559; 137/599;
116/273; 222/40
[58] Field of Search .................. 137/559, 599, 561 A,
137/561 R; 116/273, 274, DIG. 7; 222/40

[56] References Cited

U.S. PATENT DOCUMENTS

| | | | |
|---|---|---|---|
| 445,909 | 2/1891 | Shontz | 137/599 X |
| 846,100 | 3/1907 | Estep | 137/599 |
| 1,345,733 | 7/1920 | Ayres | 116/273 X |
| 1,730,118 | 10/1929 | Cobb | 116/273 |
| 1,730,127 | 10/1929 | Davenport | 116/273 |
| 2,008,460 | 7/1935 | McCandless | 222/40 X |
| 2,678,624 | 5/1954 | Grise et al. | 116/273 |
| 2,836,142 | 5/1958 | Ainsworth | 116/274 |
| 2,847,969 | 8/1958 | Woodruff | 116/273 |
| 3,776,274 | 12/1973 | Riley | 137/599 |
| 4,819,577 | 4/1989 | Campau | 116/273 X |

Primary Examiner—John Rivell

[57] ABSTRACT

A fractional flow indicator system by which flow in a fluid dispensing conduit is visually indicated using an improved fractional flow diverting element which utilizes a venturi effect rather than a check valve to create a fractional flow pressure differential to induce a fractional fluid flow through a flow indicator. The flow diverting element of the present invention has no moving parts, is easy and relatively inexpensive to manufacture, and does not restrict or reduce the pressure of the main fluid stream flowing therethrough. In accordance with the preferred embodiment, the flow diverting element is constructed from standard elbow components and a short length of copper tubing. The flow indicator system further includes an improved flow indicator having a compact construction with few working parts, which is easy to manufacture, less expensive to produce, and which provides a longer service life than conventional indicators. In particular, the flow indicator of the present invention does not include a multi-part pedestal, a precisely machined diverting nozzle, and a corresponding precisely machined port.

23 Claims, 3 Drawing Sheets

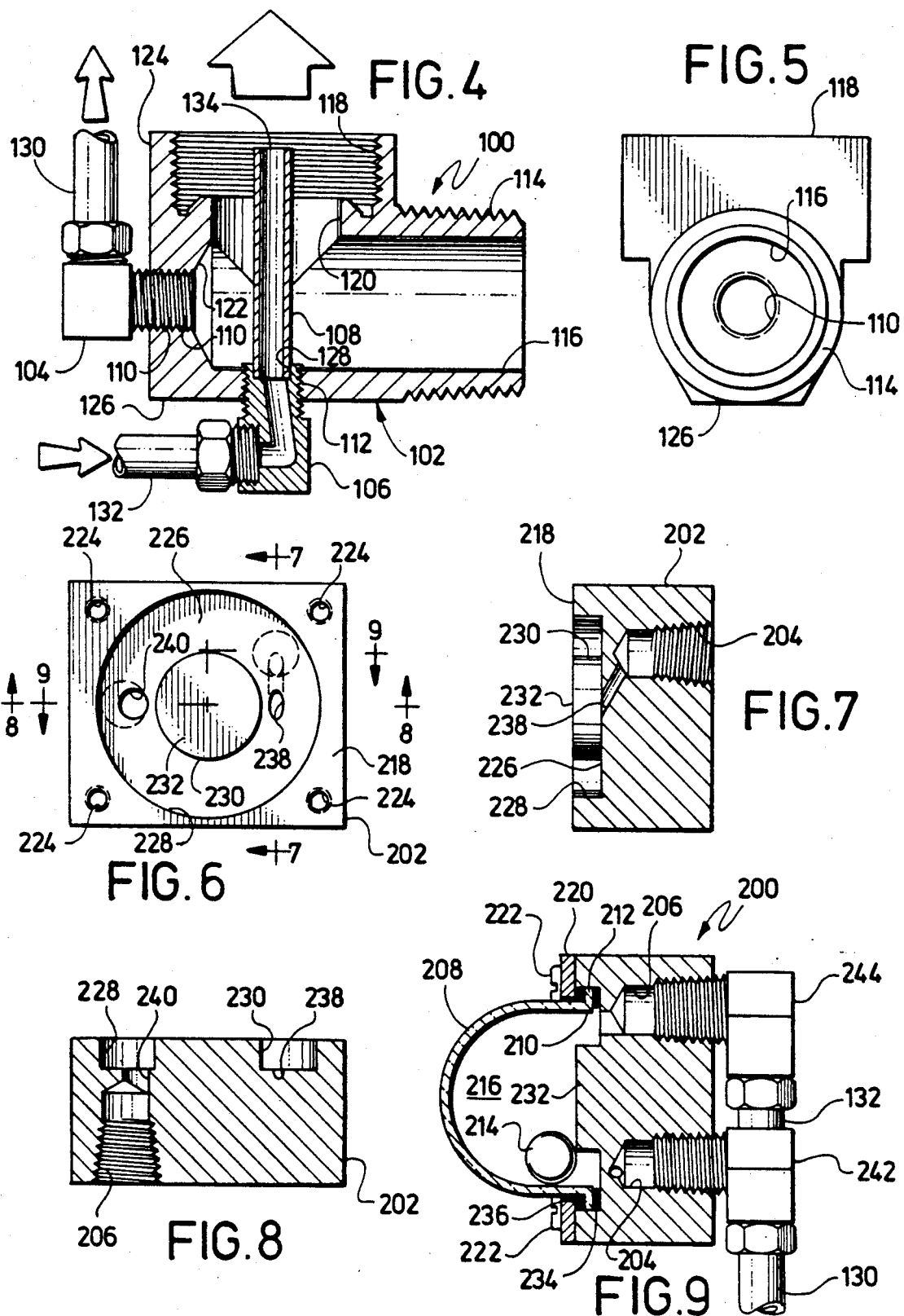

FLUID FLOW INDICATOR SYSTEM

BACKGROUND OF THE INVENTION

This invention relates to liquid dispensing apparatus and, more particularly, it concerns an improved visual flow indicating system for a fuel dispenser.

Visual fluid flow indicators are well known in the fuel dispenser art and conventionally employ a metallic base having a fluid inlet and a fluid outlet which feed fluid thru a chamber created by the attachment of a dome-shaped transparent cover to the base. A number of movable indicating elements, such as, brightly colored balls are enclosed within the chamber so that when fluid flows through the indicator, the movable flow indicating elements circulate about the chamber and provide a visual indication that flow is occurring and, thus, fuel is being dispensed. The transparent cover also allows for a visual inspection of the fluid being dispensed and an opportunity to ascertain whether or not air or gas is being dispensed along with the liquid.

Early fuel pump flow indicator designs, such as described, for example, in U.S. Pat. No. 1,730,118 issued to R. W. Cobb on Oct. 1, 1929, incorporated relatively large flow indicators which accommodated the full fluid flow of the liquid being dispensed. Such indicators were placed in the fuel dispensing conduit between the fuel pump and the flexible dispensing hose. Since all of the liquid being dispensed had to flow through the flow indicator, any resistance to flow created by the flow indicator tended to reduce the flow rate of the liquid being dispensed.

In an effort to reduce the size, bulk, and expense of the above-mentioned large-sized flow indicators, fractional or partial flow indicator systems were developed. In such a fractional flow indicator system, only a portion of the fluid flowing through a dispenser conduit is diverted to a relatively small-sized visual flow indicator. One example of such a fractional flow indicator system is described in U.S. Pat. No. 2,678,624 issued to A. L. Grise et al on May 18, 1954.

Another example of a conventional fractional flow indicating system is shown in FIGS. 1-3 of the drawings and generally designated by the reference numeral 10. The flow indicating system 10 includes a fractional flow diverting section generally designated 12 (FIGS. 1 and 3) which provides a fractional fluid flow to a flow indicator 14 (FIGS. 1 and 2) when fluid is being dispensed. The fractional flow diverting section 12 includes a fractional flow output 16 in a flow conduit 18 of a meter support and diaphragm valve 20, a restrictor valve 22 (shown in a closed position) located between the flow conduit 18 and a curved elbow 24 which leads to a fluid conduit or pipe 26, and a fractional flow return 28 in the curved elbow 24.

Typically, the fractional flow output 16 and return 28 are each ⅛N.P.T.×¼O.D.T. brass elbow fittings which are secured within respective threaded openings in the conduit 18 and the curved elbow 24. Lengths 30 and 32 of ¼ inch copper tubing operatively connect the fractional flow output 16 and return 28 to the flow indicator 14.

When the fluid pressure in the conduit 18 exceeds the back pressure provided by the spring in the check valve 22, the valve 22 opens and allows fluid to flow from the conduit 18 to the curved elbow 24, pipe 26 and eventually through a flexible hose and dispensing nozzle (not shown) in a conventional manner. As fluid flows through the conduits 18 and 26, the check valve 22 creates a pressure drop between the fluid in the upstream conduit 18 and the downstream conduit 26. This pressure differential created by the restrictor valve 22 is sufficient to induce fluid flow through the fractional output 16, up through the tubing 30, through the flow indicator 14, down through the tubing 32 and back through the fractional flow return 28 into the curved elbow 24.

Although the restrictor valve 22 is effective at providing a sufficient pressure differential to induce flow through the flow indicator 14, there are several drawbacks associated with such a restrictor valve. Since substantially all of the fluid being dispensed must pass through the restrictor valve 22, the valve tends to reduce the fluid flow rate and pressure. One method of compensating for this reduction in flow rate and pressure is by using more expensive fuel pumps and motors capable of producing greater fluid flow rates and pressures. Also, the restrictor valve 22 includes one or more gaskets 34 and moving parts which are subject to wear. Furthermore, assembly of the flow diverting section 12 of flow indicating system 10 requires that respective threaded openings be constructed in the conduit 18 and the curved elbow 24 to accommodate the output 16 and the return 28.

With reference again to FIGS. 1 and 2 of the drawings, the flow indicator 14 includes a metallic base 36 having a threaded fluid inlet 38 and a threaded fluid outlet 40. The inlet 38 receives a small-sized elbow fitting 42 which in turn receives the upper end of the tubing 30. The outlet 40 receives a straight fitting 44 within which the upper end of the tubing 32 is received.

The flow indicator 14 further includes a dome-shaped glass cover 46 having a circular base including a circumferentially extending flange 48 which facilitates attachment of the cover 46 to the indicator base 36 by a clamp ring 50. The clamp ring 50 is fastened to the indicator base 36 by four counter sunk, flat head machine screws (not shown). An o-ring 52 is provided between the clamp ring 50 and the glass flange 48 to ensure that the flange 48 is not damaged. Another o-ring 54 is partially received within an annular recess 56 in the indicator base 36 opposite the cover flange 48 in order to provide a fluid tight seal between the base 36 and the glass cover 46.

A fluid chamber 58 defined in large part by the inner surface of the glass dome 46 houses a pair of movable flow indicating elements or balls 60. A multi-part pedestal 62 made up of a round head machine screw 64, a washer 66, and a lock nut 68 is disposed within the chamber 58 with the shaft of the machine screw 64 being received within a threaded bore 70 in the base 36. The washer 66 of the pedestal 62 keeps the balls 60 from blocking the fluid outlet 40 and also serves to protect an inlet nozzle 72.

The nozzle 72 is partially received within an angled port 74 which operatively connects the inlet 38 with the fluid chamber 58. The angled port 74 and the nozzle 72 must both be machined to exacting tolerances so that a fluid tight seal is formed between the inner surface of the angled port 74 and the outer surface of the nozzle 72. The nozzle 72 includes a small jet or opening 76 which accelerates the fluid passing through the nozzle 72 and directs the fluid in a manner producing a positive circulating motion of the fluid and the balls 60 in the chamber 58.

As shown most clearly in FIG. 1 of the drawings, the flow indicator 14 is attached to a side wall 78 of a fuel dispenser 80 by an angled bracket member 82. The glass dome 46 and a portion of the clamp ring 50 protrude from a circular opening in an upper side sheath 84 to provide a visual indication of fluid flow when fuel is being dispensed from the dispenser 80.

Even though the above-described flow indicator 14 provides an effective visual indication of fluid flow through the fluid conduits 18 and 26, construction and assembly of such an indicator is complicated and expensive in that the indicator is made up of a number of parts and, as such, requires a number of assembly steps and because the nozzle 72 and angled port 74 must be machined to exacting tolerances.

In light of the foregoing, there is a need for an improved flow indicator system, fractional flow diverting component and/or flow indicator.

SUMMARY OF THE INVENTION

In accordance with the present invention, the problems associated with conventional flow indicators and systems are substantially overcome by a flow indicator system by which flow in a fluid dispensing conduit is visually indicated using an improved fractional flow diverting element which does not restrict fluid flow, has no moving parts or special seals, which can be manufactured from standard elbow components, and, as such, is inexpensive to produce and enjoys a long service life. The present flow indicator system further includes an improved flow indicator having a very compact construction and few working parts, which is easy to manufacture, and, as such, less expensive to produce and has a longer service life than conventional indicators.

The fractional flow diverting element of the present invention utilizes a venturi effect rather than a check valve to create the necessary fractional flow pressure differential to induce a fractional fluid flow through the flow indicator. The present invention not only does away with the need for the check or restrictor valve of conventional fractional flow diverting apparatus, but in so doing also eliminates the undesirable flow restriction and reduction in fluid pressure experienced by conventional diverting apparatus. Furthermore, by eliminating the check valve, the flow diverting element of the present invention has no moving parts, requires no special seals, and, thereby, enjoys a long service-free life.

The flow indicator of the present invention is much easier to manufacture, less expensive, and has a longer operating life than conventional flow indicators because, for example, it does not include a multi-part pedestal, does not include a precisely machined diverting nozzle, and also does not require a corresponding precisely machined fluid port. The flow indicator of the present invention is very compact in that the indicator base has been reduced to a rectangle measuring about 1.00×1.75×2.00 inches.

The invention is particularly though not exclusively adapted for use in fuel dispensers and may find applicability in other fluid dispensing apparatus where there is a need to have a visual indication of fluid flow and/or a fractional flow pressure differential relating to fluid flow.

In the practice of the present invention, the improved fractional flow diverting element and the improved flow indicator are either added to a fuel dispenser during dispenser assembly, used to replace existing fuel dispenser flow indicating components, or used to convert an existing dispenser to a flow indicating type dispenser.

In accordance with a preferred embodiment, the flow diverting element of the present invention is constructed from a standard elbow fitting which is modified to include a fractional flow outlet port in the end face opposite the major flow inlet and a fractional flow inlet port fitted with a venturi tube in the end face opposite the major flow outlet. Further in accordance with the preferred embodiment, the flow indicator of the present invention includes a rectangular base, a transparent cover, two resilient seals, a pair of movable indicating spheres, and a cover retaining bracket which also serves as the flow indicator mounting bracket.

Accordingly, a principal object of the present invention is to provide a device for indicating fluid flow in a dispenser conduit without restricting fluid flow therethrough. Another and more specific object of the invention is the provision of a fractional flow diverting component having no moving parts, no flow restrictions, no back pressure, no resilient seals, which is easy to manufacture, and, as such, inexpensive to produce. Yet another and more specific object of the present invention is to provide such a fractional flow diverting element which is compatible with existing dispenser components and conduits. Still another object of the present invention is the provision of a flow indicator having a compact construction with few working parts, which is easy to manufacture, and, thus, inexpensive to produce. Another and more specific object of the present invention is to provide an improved flow indicator which is compatible with existing dispenser components and housing structures. Other objects and further scope of applicability of the present invention will become apparent from the detailed description to follow taken in conjunction with the accompanying drawings in which like parts are designated by like reference characters.

BRIEF DESCRIPTION OF THE DRAWINGS

FIG. 4 is a cross section illustration of the fractional flow diverting component of the flow indicating system of the present invention;

FIG. 5 is an end view of just the large elbow element of the flow diverting component of FIG. 4:

FIG. 6 is a front view illustrating the base of the flow indicator in accordance with the present invention;

FIG. 7 is a cross section of the base of FIG. 6 taken along line 7—7;

FIG. 8 is a midline cross section of the flow indicator base of FIG. 6 taken along line 8—8;

FIG. 9 is a stepped cross section of a fully assembled flow indicator in accordance with the present invention taken along line 9—9 in FIG. 6; and, FIGS. 10, 11 and 12 are top, front and back views, respectively, of the flow indicator of FIG. 9.

DETAILED DESCRIPTION OF THE PREFERRED EMBODIMENT

Figures 1, 2, 3:
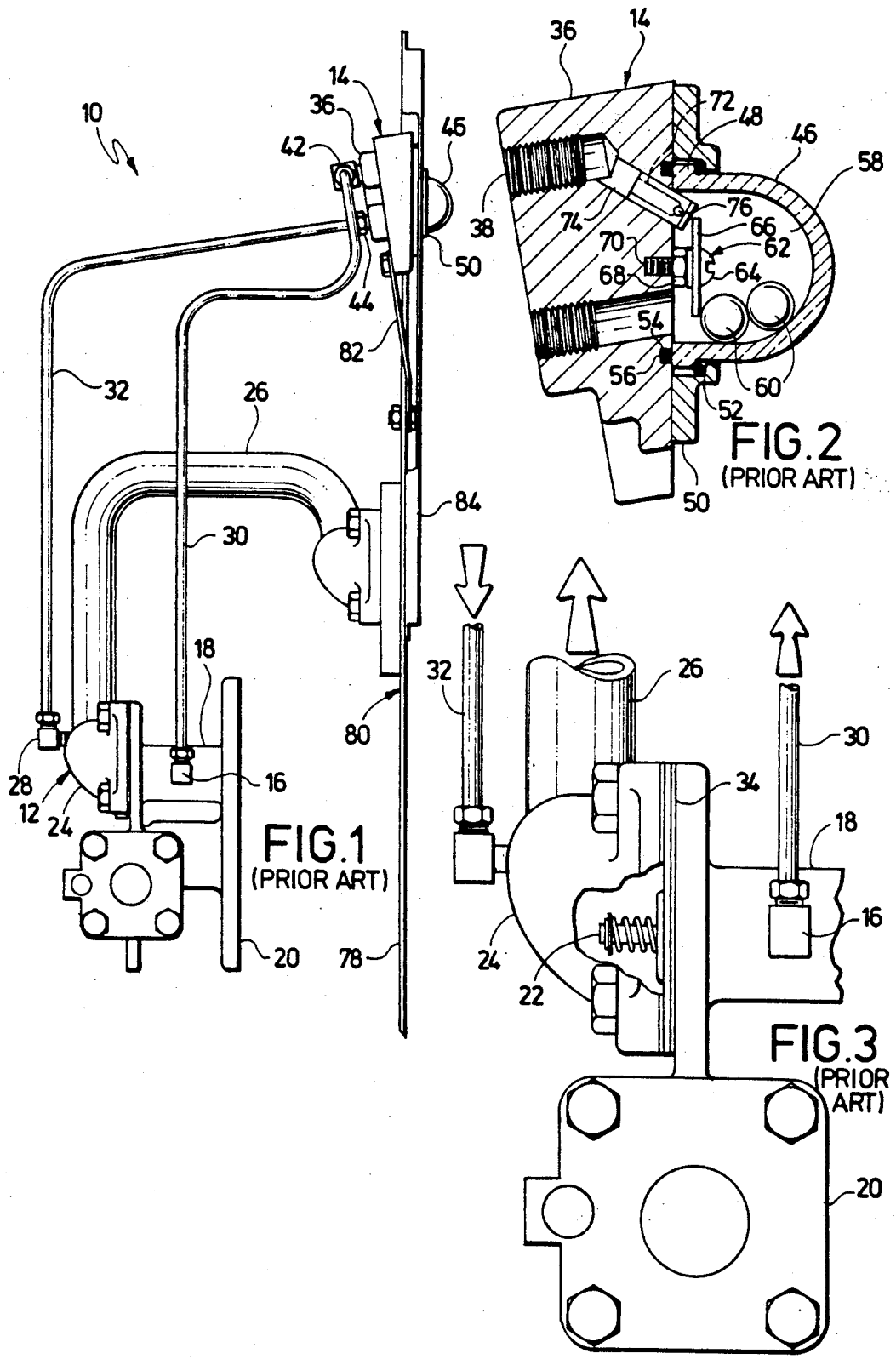
FIG. 1 is a partial cross section illustrating a conventional fuel dispenser and showing only those parts associated with the fractional flow indicator system.
FIG. 2 is an enlarged cross section representing the flow indicator of FIG. 1.
FIG. 3 is an enlarged fragmentary cross section illustrating the flow restricting valve of FIG. 1.

In FIG. 4 of the drawings, an exemplary embodiment of an improved fractional flow diverting assembly in accordance with the present invention is generally designated by the reference numeral 100 and shown to include as major components a large-sized elbow 102, two small-sized elbow fittings 104 and 106, and a venturi tube 108.

With reference to FIGS. 4 and 5 of the drawings, the relatively large elbow 102 is preferably a standard, commercially available, brass, valveless inverted flare elbow which has been modified to include two threaded openings 110 and 112 which serve as fractional output and input ports and are adapted to receive the small-sized elbow fittings 104 and 106, respectively. The elbow 102 includes as conventional features an externally threaded fluid inlet 114 having a ⅜ inch diameter circular bore 116 and an internally threaded fluid outlet 118 having a recessed, ⅜ inch diameter, circular bore 120 oriented perpendicular to the inlet bore 116. The inlet bore 116 ends in a concave or countersunk surface 122 which serves to angularly redirect the fluid from the inlet 114 to the outlet 118.

With reference again to FIGS. 4 and 5 of the drawings, the threaded opening or fractional output port 110 extends from the concave interior surface 122 to a first planar exterior surface 124 of the elbow 102. As shown most clearly in FIG. 5 of the drawings, the opening 110 is substantially centrally locate with respect to the circular bore 116. The threaded opening or fractional output port 112 extends from the circular bore 116 to a second planar exterior surface 126 of the elbow 102. The threaded opening 112 is substantially centrally located with respect to the circular bore 120.

In accordance with a preferred embodiment, the small-sized elbow fittings 104 and 106 are standard ¼ inch O.D. tube flare brass elbow fittings with the elbow fitting 106 being modified to include a circular counterbore 128 sized to receive one end of the venturi tube 108. In accordance with the same preferred embodiment, the venturi tube 108 is an approximately 1¼ inch long section of ¼ inch O.D. copper tubing. The venturi tube 108 is attached to the counterbore 128 of the small elbow fitting 106 by, for example, a Loctite compound.

The small-sized elbow fittings 104 and 106 are adapted to receive the lower end of lengths of ¼ inch O.D. copper tubing 130 and 132 which provide a fractional fluid flow to and from a flow indicator. As such, the tubing lengths 130 and 132 serve the same purpose as the tubing lengths 30 and 32 shown in FIG. 1.

It is preferred that the fractional flow diverting assembly 100 shown in FIG. 4 of the drawings be substituted for the conventional curved elbow 24 and restrictor valve 22 of FIGS. 1 and 3 with the inlet 114 being threaded into the flow conduit 18 of the meter support and diaphragm valve 20 and the outlet 118 receiving one end of the dispensing conduit 26. Although not preferred, it is to be understood that the flow diverting assembly 100 may be located in other positions along the dispensing conduit 26, for example, between the curved elbow 24 and the dispensing conduit 26. In this instance, the curved elbow 24 would not include the restrictor valve 22.

In the practice of the present invention, as fluid flows through the elbow 102, it enters the major inlet 114 and travels along the circular bore 116 in a first direction, passes around the venturi tube 108 and strikes the opposing surface 122 which abruptly changes the direction of the fluid and causes it to travel in a second direction perpendicular to the first direction along the circular bore 120 and eventually out the major outlet 118. A fraction of the fluid which is directed at the surface 122 passes through the threaded opening or port 110, into the small-sized elbow 104, and along the tubing 130 to a flow indicator. The pressure of the fluid passing through the threaded opening or port 110 is equal to or greater than the pressure of the fluid entering the major inlet 114 due to the positive velocity pressure created by an abrupt change in the fluid flow direction. As fluid exits the elbow 102 through the major outlet 118, it passes by a free or open end 134 of the venturi tube 108 and produces a syphoning effect which tends to reduce the fluid pressure at the end 134 of the venturi tube 108 and induce fluid flow through the fractional output port 110, through the small elbow 104, up through the tubing 130, through a flow indicator, down through the tubing 132, through the small elbow 106, and through the venturi tube 108 where the diverted fractional fluid is returned to the main fluid stream in the area of the major outlet 118. As such, the fractional flow diverting assembly 100 of the present invention utilizes a venturi effect to produce the necessary pressure differential to induce the fractional fluid flow through a flow indicator. In that the present invention does not rely upon the back pressure and restriction provided by a conventional restrictor valve (FIG. 3), the flow restriction and pressure reduction problems associated with conventional fractional flow diverting elements are eliminated.

In a comparative example, a 9.5 gallons per minute flow rate was produced using the fractional flow diverting assembly 100 of the present invention as compared to an 8.8 gallons per minute flow rate provided by a conventional flow diverting element including a restrictor valve (FIGS. 1 and 3). Thus, the pressure flow diverting assembly 100 in accordance with the present invention provided a net increase in flow rate of 0.7 gallons per minute. Further, at a 10 gallon per minute flow rate the fractional flow diverting assembly 100 of the present invention did not produce a measurable reduction in pressure of the fluid flowing through the elbow 102, while the conventional flow diverting element including the restrictor valve (FIGS. 1 and 3) caused a three pounds per square inch pressure drop which corresponds to the spring force in the restrictor valve. Thus, the flow diverting elbow 100 of the present invention provides for a fractional fluid flow for a visual flow indicator without restricting flow and creating an undesirable pressure drop in the fluid being dispensed.

Even though it is preferred that the flow diverting assembly 100 of FIGS. 4 and 5 be used in conjunction with the flow indicator of the present invention as shown in FIGS. 6–12 and described below, it is to be understood that the fractional flow diverting assembly 100 can be used with existing flow indicator components and that the flow indicator of FIGS. 6–12 can be used with conventional fractional flow diverting elements or components.

As shown in FIGS. 6–12 of the drawings, an exemplary embodiment of the flow indicator of the present invention is generally designated by the reference numeral 200 and shown to include as major components a rectangular, metal base 202 constructed from, for example, an aluminum bar about 1.00 inch thick, 1.75 inches wide, and 2.00 inches long and having fractional flow input and output passages 204 and 206, a dome-shaped cover 208 formed of a transparent material such as glass and having a circular open end 210 and a circumferential flange 212 adjacent the open end, and a pair of movable flow indicating bodies 214 located within a fluid chamber 216 defined by the base 202 and a cover 208.

In the illustrated embodiment, the transparent cover 208 is attached to the front surface of the base 202 by a retainer bracket 220. The cover retaining bracket 220 is secured to the base 202 by four machine screws 222, such as, four #10-32×½ inch screws received within corresponding threaded openings 224 in the front surface 218 of the base 202.

With reference to FIGS. 6–9 of the drawings, the front surface 218 of the base 202 includes an annular recess 226 having an outer diameter 228 and an inner diameter 230. The outer diameter 228 of the annular recess 226 corresponds to the circumference of the flange 212 extending from the opened end 210 of the transparent cover 208. The inner diameter 230 of the annular recess 226 defines a pedestal 232 which projects into the chamber 216 and which is integral with the base 202.

With particular reference to FIG. 9 of the drawings, the depth of the annular recess 226 in the base 202 provides for the placement of a first o-ring 234 between the circumferential flange 212 and the base 202 and a second smaller o-ring 236 between the circumferential flange 212 and the retainer bracket 220. In this arrangement, the o-ring 234 provides a fluid type seal between the transparent cover 208 and the base 202. The o-ring 236 allows for slight manufacturing variations and insures that the transparent cover 208 is not damaged by the retainer bracket 220. The width of the annular recess 226, that is the distance between the inner and outer diameters 230 and 228, is large enough to accommodate the intersection of the recess 226 with a small angled fluid inlet 238 extending from the input passage 204, for example, a 0.093 inch diameter opening extending at a 60° angle with respect to the longitudinal axis of the passage 204, and a larger sized fluid outlet 240 providing fluid communication with the output passage 206. The width of the annular recess 226 is narrow enough, however, to restrict the movement of the moveable flow indicating elements 214, such as brightly colored plastic balls, to prevent blockage of the fluid outlet 240 during fluid flow through the chamber 216.

The diameter of the angled fluid inlet 238 is about half that of the diameter of the fluid outlet 240 so that during fluid flow through the flow indicator 200 the small angled fluid inlet 238 produces a high velocity fluid jet which creates a positive circulating fluid motion within the chamber 216. This circulating fluid motion within the chamber 216 causes the moveable elements 214 to circulate about the chamber and, thereby, provide a visual indication of fluid flow. Also, this positive fluid circulation about the fluid chamber 216 and the location of the fluid outlet 240 adjacent the upper edge of the transparent cover 208 (FIGS. 9 and 11) facilitates the removal of any air or gas from the chamber 216.

Figure 10:
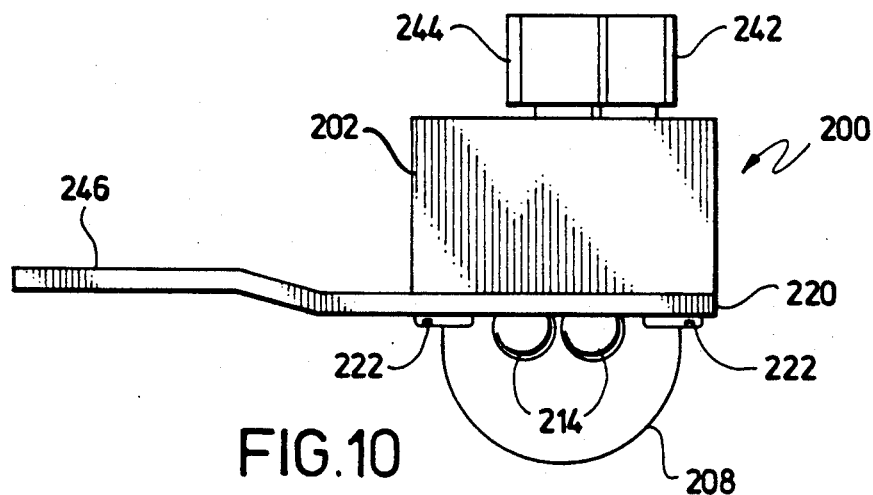
Figure 11:
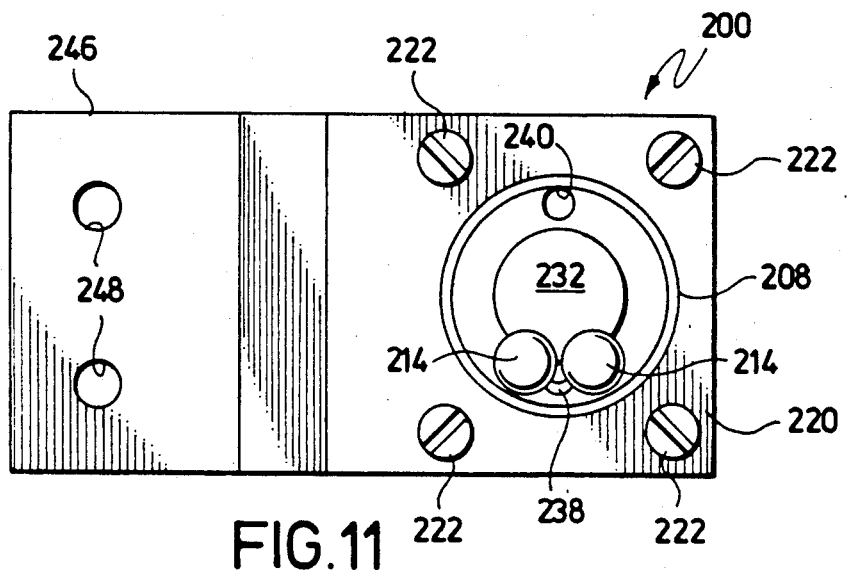
Figure 12:
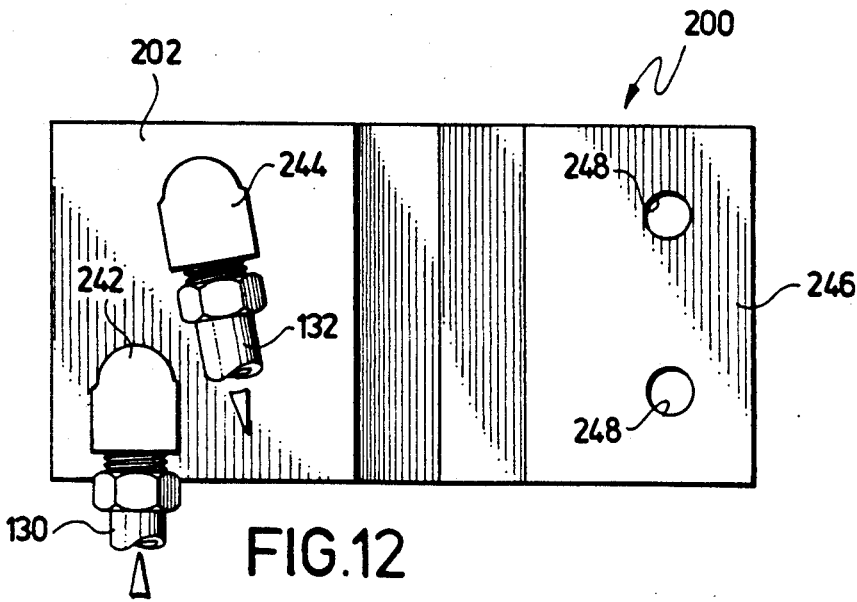

As shown in FIGS. 9, 10, and 12 of the drawings, the input passage 204 is adapted to receive a small-sized elbow fitting 242 which in turn receives the upper end of the tubing length 130. Similarly, the output passage 206 is adapted to receive a small-sized elbow fitting 244 which is connected to the upper end of the tubing 132. In this manner, the flow indicator 200 receives a fractional fluid flow from the flow diverting element 100 up along the tubing 130, through the elbow 242, through the small angled inlet 238, through the chamber 216, through the fluid outlet 240, through the small-sized elbow 244, and returns this fractional fluid down through the tubing 132 back to the diverting elbow 100. It is preferred that each of the elbow fittings 242 and 244 are standard ¼ inch O.D. tube flare brass elbow fittings.

With reference again to FIGS. 10–12 of the drawings, the cover retaining bracket 220 has a lateral extension 246 having a pair of circular openings 248 to facilitate the mounting of the flow indicator 200 to a fuel dispenser. As such, the cover retainer bracket 220 serves the dual purpose of not only attaching the transparent cover 208 to the base 202, but also providing for the mounting of the flow indicator 200 to a fuel dispenser. Hence, a separate indicator mounting bracket is not needed.

Thus, it will be appreciated that as a result of the present invention a highly effective fractional fluid flow indicating system, fractional flow diverting assembly, and flow indicator are provided by which the principal object and others are completely fulfilled. It is contemplated and will be apparent to those skilled in the art from the foregoing description and accompanying drawing illustrations that variations and/or modifications of the disclosed embodiment may be made without departure from the invention. For example, the small-sized elbow fittings 104 and 106 of the flow diverting assembly 100 and small-sized elbow fittings 242 and 244 of the flow indicator assembly 200 may be replaced by straight fittings without departure from the present invention. Furthermore, it is contemplated that the 90° elbow 102 shown in FIGS. 4 and 5 may be instead any one of a variety of elbows having inlet and outlet bores or channels which intersect at an angle of less than 180°. Accordingly, it is expressly intended that the foregoing description and accompanying drawings are illustrative of a preferred embodiment only, not limiting, and that the true spirit and scope of the present invention be determined by reference to the appended claims.

What is claimed is:

1. A flow indicator system for use with a fuel dispenser, said system comprising a flow indicator including a substantially rectangular base having fractional flow input and output passages, a transparent dome-shaped cover having a circular open end and a circumferential flange adjacent said open end, one or more movable flow indicating bodies located within a chamber created by said base and said cover, a retainer bracket for attaching said cover to said base, resilient means providing a fluid tight seal between said transparent cover and said base, an annular recess in the front surface of said base adapted for receiving the open end of said cover and intersecting with a small angled fluid inlet extending from said input passage and a larger sized fluid outlet extending from said output passage, and wherein the width of said annular recess is less than the diameter of said flow indicating bodies and the depth of said annular recess is sufficient to prevent said flow indicating bodies from blocking said fluid outlet, and a fractional flow diverting element including an elbow for angularly directing the flow of fluid, said elbow including a major inlet for receiving fluid from a fluid supply conduit, a surface opposite said major inlet for angularly directing the flow of fluid through said elbow, a major outlet for discharging the angularly directed fluid flow, a fractional output port for diverting a fraction of said fluid received by said major inlet at a first fluid pressure, and a fractional input port for returning fluid diverted by said fractional output into said angularly directed fluid flow in the area of said major outlet and at a second fluid pressure less than said first fluid pressure.

2. The flow indicator system of claim 1, wherein said fractional output port comprises a first threaded opening adapted to receive a first small-sized fitting.

3. The flow indicator system of claim 1, wherein said fractional input port comprises a second threaded opening adapted to receive a second small-sized fitting which supports a section of tubing extending substantially from said second threaded opening to said major outlet.

4. The flow indicator system of claim 2, wherein said fractional input port comprises a second threaded opening adapted to receive a second small-sized fitting which supports a section of tubing extending substantially from said second threaded opening to said major outlet.

5. The flow indicator system of claim 4, wherein each of said first and second small-sized fittings are elbow fittings.

6. A flow indicator system for use with a fuel dispenser, said system comprising a fractional flow diverting element including an elbow for angularly directing the flow of fluid, said elbow including a major inlet for receiving fluid from a fluid supply conduit, a surface opposite said major inlet for angularly directing the flow of fluid through said elbow, a major outlet for discharging the angularly directed fluid flow, a fractional output port for diverting a fraction of said fluid received by said major inlet at a first fluid pressure, and a fractional input port for returning fluid diverted by said fractional output into said angularly directed fluid flow in the area of said major outlet and at a second fluid pressure less than said first fluid pressure, wherein said system further comprises a flow indicator including a substantially rectangular base having fractional flow input and output passages, a transparent dome-shaped cover having a circular open end and a circumferential flange adjacent said open end, one or more moveable flow indicating bodies located within a chamber created by said base and said cover, a retainer bracket for attaching said cover to said base, resilient means providing a fluid tight seal between said transparent cover and said base, an annular recess in the front surface of said base adapted for receiving the open end of said cover and intersecting with a small angled fluid inlet extending from said input passage and a larger sized fluid outlet extending from said output passage, and wherein the width of said annular recess is less that the diameter of said flow indicating bodies and the depth of said annular recess is sufficient to prevent said flow indicating bodies from blocking said fluid outlet, and wherein each of said input and output passages comprises a threaded bore in the back surface of said base.

7. A flow indicator system of claim 6, wherein each of said threaded bores is adapted to receive a small-sized elbow fitting.

8. The flow indicator system of claim 7, wherein said fractional output port of said diverting element comprises a first threaded opening adapted to receive a first small-sized elbow fitting.

9. A flow indicator system of claim 8, wherein said fractional input port of said diverting element comprises a second threaded opening adapted to receive a second small-sized elbow fitting which supports a section of tubing extending substantially from said second threaded opening to said major outlet.

10. A fractional flow diverting element comprising a valveless right angle inverted flare elbow for angularly directing the flow of fluid, said elbow including a major inlet for receiving fluid from a fluid supply conduit, a surface opposite said major inlet for angularly directing the flow of fluid through said elbow, a major outlet for discharging the angularly directed fluid flow, a fractional output port for diverting a fraction of said fluid received by said major inlet at a first fluid pressure, and a fractional input port for returning fluid diverted by said fractional output into said angularly directed fluid flow in the area of said major outlet and at a second fluid pressure less than said first fluid pressure.

11. The fractional flow diverting element of claim 10, wherein said fractional output port comprises a first threaded opening adapted to receive a first small-sized fitting.

12. The fractional flow diverting element of claim 10, wherein said fractional input port comprises a second threaded opening adapted to receive a second small-sized fitting which supports a section of tubing extending substantially from said second threaded opening to said major outlet.

13. The fractional flow diverting element of claim 12, wherein said fractional output port comprises a first threaded opening adapted to receive a first small-sized fitting.

14. The fractional flow diverting element of claim 13, wherein each of said first and second small-sized fittings are elbow fittings.

15. A flow indicator comprising a substantially rectangular base having fractional flow input and output passages, a transparent dome-shaped cover having a circular open end and a circumferential flange adjacent said open end, one or more movable flow indicating bodies located within a chamber created by said base and said cover, a retainer bracket for attaching said cover to said base, resilient means providing a fluid tight seal between said transparent cover and said base, an annular recess in the front surface of said base adapted for receiving the open end of said cover and intersecting with a small angled fluid inlet extending from said input passage and a larger sized fluid outlet extending from said output passage, and wherein the width of said annular recess is less than the diameter of said flow indicating bodies and the depth of said annular recess is sufficient to prevent said flow indicating bodies from blocking said fluid outlet.

16. The flow indicator of claim 15, wherein each of said input and output passages comprises a threaded bore in the back surface of said base.

17. The flow indicator of claim 16, wherein each of said threaded bores is adapted to receive a small-sized elbow fitting.

18. The flow indicator of claim 15, wherein said retainer bracket extends beyond at least one lateral edge of said base for mounting said indicator to a dispenser.

19. The flow indicator of claim 15, wherein said resilient means comprises a pair of o-rings, one of said o-rings being located between said circumferential flange and said annular recess and the other of said o-rings being located between said circumferential flange and said retaining bracket.

20. The flow indicator of claim 15, wherein the diameter of said small angled fluid inlet is about ½ the diameter of said larger sized fluid outlet.

21. In a fuel dispenser having a fractional flow indicator system, the improvement comprising:

a fractional flow diverting element including a valveless right angle inverted flare elbow for angularly directing the flow of fluid, said elbow including a major inlet for receiving fluid from a fluid supply conduit, a surface opposite said major inlet for angularly directing the flow of fluid through said elbow, a major outlet for discharging the angularly directed fluid flow, a fractional output port for diverting a fraction of said fluid received by said major inlet at a first fluid pressure, and a fractional input port for returning fluid diverted by said fractional output into said angularly directed fluid flow in the area of said major outlet and at a second fluid pressure less than said first fluid pressure.

22. In a fuel dispenser having a fractional flow indicator system, the improvement comprising:

a fractional flow diverting element including a right angled inverted flare elbow for angularly directing the flow of fluid, said elbow including a major inlet for receiving fluid from a fluid supply conduit, a surface opposite said major inlet for angularly directing the flow of fluid through said elbow, a major outlet for discharging the angularly directed fluid flow, a fractional output port for diverting a fraction of said fluid received by said major inlet at a first fluid pressure, and a fractional input port for returning fluid diverted by said fractional output into said angularly directed fluid flow in the area of said major outlet and at a second fluid pressure less than said first fluid pressure, and a flow indicator including a substantially rectangular base having fractional flow input and output passages, a transparent dome-shaped cover having a circular open end and a circumferential flange adjacent said open end, one or more movable flow indicating bodies located within a chamber created by said base and said cover, a retainer bracket for attaching said cover to said base, resilient means providing a fluid tight seal between said transparent cover and said base, an annular recess in the front surface of said base adapted for receiving the open end of said cover and intersecting with a small angled fluid inlet extending from said input passage and a larger sized fluid outlet extending from said output passage, and wherein the width of said annular recess is less than the diameter of said flow indicating bodies and the depth of said annular recess is sufficient to prevent said flow indicating bodies from blocking said fluid outlet.

23. In a fuel dispenser having a fractional flow indicator system, the improvement comprising:

a flow indicator including a substantially rectangular base having fractional flow input and output passages, a transparent dome-shaped cover having a circular open end and a circumferential flange adjacent said open end, one or more movable flow indicating bodies located within a chamber created by said base and said cover, a retainer bracket for attaching said cover to said base, resilient means providing a fluid tight seal between said transparent cover and said base, an annular recess in the front surface of said base adapted for receiving the open end of said cover and intersecting with a small angled fluid inlet extending from said input passage and a larger sized fluid outlet extending from said output passage, and wherein the width of said annular recess is less than the diameter of said flow indicating bodies and the depth of said annular recess is sufficient to prevent said flow indicating bodies from blocking said fluid outlet.

* * * * *